(12) United States Patent
Gillespie (10) Patent No.: US 11,929,098 B1
(45) Date of Patent: Mar. 12, 2024

(54) AUTOMATED AI AND TEMPLATE-BASED AUDIO RECORD MIXING SYSTEM AND PROCESS

(71) Applicant: John Edward Gillespie, Laguna Hills, CA (US)

(72) Inventor: John Edward Gillespie, Laguna Hills, CA (US)

( * ) Notice: Subject to any disclaimer, the term of this patent is extended or adjusted under 35 U.S.C. 154(b) by 324 days.

(21) Appl. No.: 17/412,000

(22) Filed: Aug. 25, 2021

Related U.S. Application Data (60) Provisional application No. 63/139,464, filed on Jan. 20, 2021.

(51) Int. Cl.
| | |
|---|---|
| G11B 27/031 | (2006.01) |
| G06F 16/61 | (2019.01) |
| G06F 16/638 | (2019.01) |
| G06N 20/00 | (2019.01) |
| G06Q 20/12 | (2012.01) |

(52) U.S. Cl.
CPC ........... G11B 27/031 (2013.01); G06F 16/61 (2019.01); G06F 16/638 (2019.01); G06N 20/00 (2019.01); G06Q 20/127 (2013.01)

(58) Field of Classification Search
CPC ........ G06F 3/162; G06F 16/683; G06F 16/68; G06F 16/60; G06F 3/0482
USPC .......................................................... 700/94
See application file for complete search history.

(56) References Cited

U.S. PATENT DOCUMENTS

| | | | | |
|---|---|---|---|---|
| 10,228,901 | B1* | 3/2019 | Hirst | A63F 13/40 |
| 2011/0219940 | A1* | 9/2011 | Jiang | G10H 1/366 |
| | | | | 84/622 |
| 2014/0270263 | A1* | 9/2014 | Fejzo | H04S 3/00 |
| | | | | 381/119 |
| 2014/0301573 | A1* | 10/2014 | Kiely | G11B 27/031 |
| | | | | 381/119 |
| 2015/0256598 | A1* | 9/2015 | Walker | H04L 43/087 |
| | | | | 709/217 |
| 2016/0371051 | A1* | 12/2016 | Rowe | G06F 3/165 |
| 2018/0233119 | A1* | 8/2018 | Patti | H04L 65/80 |
| 2022/0193549 | A1* | 6/2022 | Wakeland | G06N 3/08 |
| 2023/0186884 | A1* | 6/2023 | Koretzky | G10G 1/00 |
| | | | | 84/611 |

\* cited by examiner

*Primary Examiner* — Alexander Krzystan (74) *Attorney, Agent, or Firm* — Plager Schack LLP; Mark H. Plager; Stephen Hallberg (57) ABSTRACT

An automated artificial intelligence (AI) and template-based audio record mixing system and process are disclosed. The automated AI and template-based audio record mixing system and process use provided templates and AI to mix records. The artist maintains full control of how they want to record sound when utilizing the automated AI and template-based audio record mixing system and process.

17 Claims, 3 Drawing Sheets

AUTOMATED AI AND TEMPLATE-BASED AUDIO RECORD MIXING SYSTEM AND PROCESS

CLAIM OF BENEFIT TO PRIOR APPLICATION

This application claims benefit to U.S. Provisional Patent Application 63/139,464, entitled "Automated mixing application using provided templates and AI to mix records," filed Jan. 20, 2021. The U.S. Provisional Patent Application 63/139,464 is incorporated herein by reference.

BACKGROUND

Embodiments of the invention described in this specification relate generally to audio mixing, and more particularly, to an automated artificial intelligence (AI) and template-based audio record mixing system and process in which mixing is automatically performed instantaneously for artists while ensuring that the artists retain full control over how the record will sound.

Currently, custom mixing an audio record is a labor-intensive process for any musician, sound engineer, or other user in the audio mixing field. Some mixing systems mix a record but take away all control from the artist about how the record is going to sound. So, one existing problem is how one can master a record without a mix. While mixing is not required for producing an audio record, it is vital for many artists who want to master a record. Yet, most such artists lack mixing skills, know-how, ability, patience, etc. Typically, attempts at mixing result in a record that sounds far from the sound the user had envisioned or intended.

Therefore, what is needed is a way to provide an artist with full control of how they want their record mix to sound.

An automated AI and template-based audio record mixing system and process in which mixing is automatically performed instantaneously for artists while ensuring that the artists retain full control over how the record will sound.

BRIEF DESCRIPTION

A novel automated artificial intelligence (AI) and template-based audio record mixing system and process is disclosed in which sound mixing and mastering is automatically performed instantaneously for artists while ensuring that the artists retain full control over how the record will sound.

In some embodiments, the automated AI and template-based audio record mixing process comprises (i) displaying, upon a user accessing an automated AI and template-based audio record mixing cloud application service by a user computing device connecting over the Internet, a user login screen of the automated AI and template-based audio record mixing cloud application service, (ii) determining whether the user is already registered with an account on the automated AI and template-based audio record mixing cloud application service, (iii) setting up a new user account to register as a valid user of the automated AI and template-based audio record mixing cloud application service when the user is not already registered with an account on the automated AI and template-based audio record mixing cloud application service, (iv) paying, after the user sets up the new user account and is registered as a valid user, for a subscription to use the automated AI and template-based audio record mixing cloud application service, (v) uploading, from the user computing device to the automated AI and template-based audio record mixing cloud application service, files with audio tracks recorded by the user, (vi) selecting, by the user, one or more of the uploaded files or previously uploaded files with audio tracks recorded by the user, (vii) selecting, by the user, a template that corresponds to a particular desired sound from a plurality of different audio sound templates provided by the automated AI and template-based audio record mixing cloud application service, (viii) specifying, by the user, additional options, such as which instruments the user intends to be prominent in the mix, to tailor the audio track recording(s) of the selected file(s) to a particular sound the user desires, (ix) receiving a selection of a record mixing tool, by the user, to trigger automatic mixing of the file(s) based on the selected template and additional options by the automated AI and template-based audio record mixing cloud application service, and (x) outputting, by the automated AI and template-based audio record mixing cloud application service, resultant mixed master file(s) for the user to retrieve from the automated AI and template-based audio record mixing cloud application service by download onto the user computing device.

In some embodiments, the automated AI and template-based audio record mixing system comprises (i) a musician user interface of a software application that runs on a user computing device and allows a user to have complete control over a process for instantaneously and automatically creating a record mix audio file, (ii) an automated AI and template-based audio record mixing cloud application service that is hosted by a cloud server of the automated AI and template-based audio record mixing system to which the user computing device connects over the Internet to enable user interaction with the automated AI and template-based audio record mixing cloud application service by way of the musician user interface of the software application, (iii) a user authentication login system to validate user logins of registered users, (iv) an account setup, registration, and subscription payment system that enables unregistered users to setup new accounts, register, and select a subscription level and make associated subscription payments, (v) an automated AI and template-based audio record mixing platform that is a main page or site for users interacting with the automated AI and template-based audio record mixing cloud application service, (vi) a music database that stores all music files and music for each registered user, (vii) a templates database that stores template files provided by the automated AI and template-based audio record mixing cloud application service, (viii) a record mixing project manager that is a core processing unit of the automated AI and template-based audio record mixing cloud application service and monitors the automated audio record mixing for all users, (ix) a time code synchronization unit that synchronizes audio timing for all inputs (files, audio clips, etc.) used in automatically creating an audio record mixed master file, (x) an AI and machine-learning module that intelligently mixes all inputs to generate the audio record mixed master file and which improves by an interconnected feedback system with the record mixing project manager, (xi) an audio record mixing blockchain as an option to immutably store resultant audio record mixed masters and associated inputs (files, audio clips, etc.) of the project, and (xii) external cloud database storage that a user can configure for persistent storage of resultant audio record mixed master files and associated inputs (files, audio clips, etc.) of the project.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of an automated artificial intelligence (AI) and template-based audio record mixing system and process are described in which mixing and mastering are automatically performed instantaneously for artists while ensuring that the artists retain full control over how the record will sound. However, it will be clear and apparent to one skilled in the art that the invention is not limited to the embodiments set forth and that the invention can be adapted for any of several applications. In this specification, the term "automatically" means performance by a system without any or further user interaction to get a result, where the system includes several sub-system components, modules, management units (otherwise known as "managers" or "units"), processors or processes, files, databases, data tables and input data. Also, in this specification, the term and "instantaneously" means within a sufficiently short amount of time on the order of one millisecond to thirty seconds.

In some embodiments, the automated AI and template-based audio record mixing process comprises (i) displaying, upon a user accessing an automated AI and template-based audio record mixing cloud application service by a user computing device connecting over the Internet, a user login screen of the automated AI and template-based audio record mixing cloud application service, (ii) determining whether the user is already registered with an account on the automated AI and template-based audio record mixing cloud application service, (iii) setting up a new user account to register as a valid user of the automated AI and template-based audio record mixing cloud application service when the user is not already registered with an account on the automated AI and template-based audio record mixing cloud application service, (iv) paying, after the user sets up the new user account and is registered as a valid user, for a subscription to use the automated AI and template-based audio record mixing cloud application service, (v) uploading, from the user computing device to the automated AI and template-based audio record mixing cloud application service, files with audio tracks recorded by the user, (vi) selecting, by the user, one or more of the uploaded files or previously uploaded files with audio tracks recorded by the user, (vii) selecting, by the user, a template that corresponds to a particular desired sound from a plurality of different audio sound templates provided by the automated AI and template-based audio record mixing cloud application service, (viii) specifying, by the user, additional options, such as which instruments the user intends to be prominent in the mix, to tailor the audio track recording(s) of the selected file(s) to a particular sound the user desires, (ix) receiving a selection of a record mixing tool, by the user, to trigger automatic mixing of the file(s) based on the selected template and additional options by the automated AI and template-based audio record mixing cloud application service, and (x) outputting, by the automated AI and template-based audio record mixing cloud application service, resultant mixed master file(s) for the user to retrieve from the automated AI and template-based audio record mixing cloud application service by download onto the user computing device.

In some embodiments, the automated AI and template-based audio record mixing system comprises (i) a musician user interface of a software application that runs on a user computing device and allows a user to have complete control over a process for instantaneously and automatically creating a record mix audio file, (ii) an automated AI and template-based audio record mixing cloud application service that is hosted by a cloud server of the automated AI and template-based audio record mixing system to which the user computing device connects over the Internet to enable user interaction with the automated AI and template-based audio record mixing cloud application service by way of the musician user interface of the software application, (iii) a user authentication login system to validate user logins of registered users, (iv) an account setup, registration, and subscription payment system that enables unregistered users to setup new accounts, register, and select a subscription level and make associated subscription payments, (v) an automated AI and template-based audio record mixing platform that is a main page or site for users interacting with the automated AI and template-based audio record mixing cloud application service, (vi) a music database that stores all music files and music for each registered user, (vii) a templates database that stores template files provided by the automated AI and template-based audio record mixing cloud application service, (viii) a record mixing project manager that is a core processing unit of the automated AI and template-based audio record mixing cloud application service and monitors the automated audio record mixing for all users, (ix) a time code synchronization unit that synchronizes audio timing for all inputs (files, audio clips, etc.) used in automatically creating an audio record mixed master file, (x) an AI and machine-learning module that intelligently mixes all inputs to generate the audio record mixed master file and which improves by an interconnected feedback system with the record mixing project manager, (xi) an audio record mixing blockchain as an option to immutably store resultant audio record mixed masters and associated inputs (files, audio clips, etc.) of the project, and (xii) external cloud database storage that a user can configure for persistent storage of resultant audio record mixed master files and associated inputs (files, audio clips, etc.) of the project.

Embodiments of the automated AI and template-based audio record mixing system and process described in this specification solve the problems noted above by automatically and instantaneously performing sound mixing for artists while ensuring that the artists retain full control over how the record will sound. From the client-side application, the artist interacts with a client app, such as a web app provided via the cloud application service, a local app on a smart device (such as a smartphone, a tablet computing device, etc.), or a browser that accesses a web site accessible through the cloud application service and hosted on a cloud server for the automated AI and template-based audio record mixing system. The client app provides an implementation of the automated AI and template-based audio record mixing process, such that the user can interact with the client app while connected to the cloud application service to select how they want their record to sound by uploading and selecting files, and then, by using one or more provided templates and configuring other options to achieve a desired sound. Then the cloud application service automatically mixes the files based on the user selections and outputs the resulting mixed audio files to the user after completion.

Embodiments of the automated AI and template-based audio record mixing system and process described in this specification differ from and improve upon currently existing options. In particular, some embodiments differ because currently they have automated mastering but no automated mixing for artists. Automated mixing is a major first step to getting a record to sound good.

In addition, the automated AI and template-based audio record mixing system and process of the present specification improve upon the currently existing audio record mixing options which have automated mastering but lack automated mixing for artists. As noted above, mixing is a major first step to getting a record to sound good but is challenging to get right. If you have a crummy mix, you will end up with a crummy master. While there is a clear need for an automated mixing service for the musician community, none of the existing audio record mixing systems presently available have provided this. By contrast, the automated AI and template-based audio record mixing system and process of the present disclosure provides this process, whereby the artist has full control of how they want their record to sound. In some embodiments, the automated AI and template-based audio record mixing system and process is configured to produce a fully automated professional mixed record.

The automated AI and template-based audio record mixing system and process of the present disclosure may be comprised of the following elements.

1. First the user would go to the website, web app, or other supported platform of the automated audio AI and template-based mixing cloud application service (hereinafter referred to as the "automated audio AI and template-based mixing platform").

2. Then the user would upload their tracks in corresponding area of the automated audio AI and template-based mixing platform.

3. The user would then select a template that specifies how they want each instrument to sound.

4. The user would follow this by selecting additional options, such as which instruments they would want to be prominent in the mix.

5. Then the user would select a user interface (UI) tool to "mix my track" (the "mix my track" UI tool is provided by the automated audio AI and template-based mixing platform for users interacting with the system).

6. Then a cloud server that starts various underlying processing and logical (runtime) decision-making programs along with artificial intelligence (AI) module and machine-learning algorithms would send back the mixed product to the artist instantaneously.

7. This would be a monthly subscription service.

The automated AI and template-based audio record mixing system and process of the present disclosure generally works using AI and programming, which when implemented as a network-accessible software system, uses the presets provided to mix the record when a user connects and provides a base recording.

To make the automated AI and template-based audio record mixing system and process of the present disclosure, a person would need to devote a lot thought into design and programming aspects to create a cloud application service which, when installed and deployed on a cloud server and a related web server, provides and a website as a front-facing user interface layer of the system and which would host the program for the cloud application service. This would likely require computer programming by more than a single person (more likely a team of programmers) since building the cloud application service and web app/web interface are only part of the task to make the automated AI and template-based audio record mixing system and process. Further work involves configuring and deploying the web server that hosts the front end web app/web interface, configuring and deploying the cloud server and installing the software implementation of the automated AI and template-based audio record mixing process to run as the core processing and logical (runtime) decision-making program, which underlies the web server, along with programming, installing, configuring, and deploying the artificial intelligence (AI) module(s) and machine-learning algorithm(s), as well as the mixing templates available for selection or automated add-in (loading). Note that the last step (seven) of the automated AI and template-based audio record mixing process could be the first step for requiring the purchase of a subscription.

Figure 1:
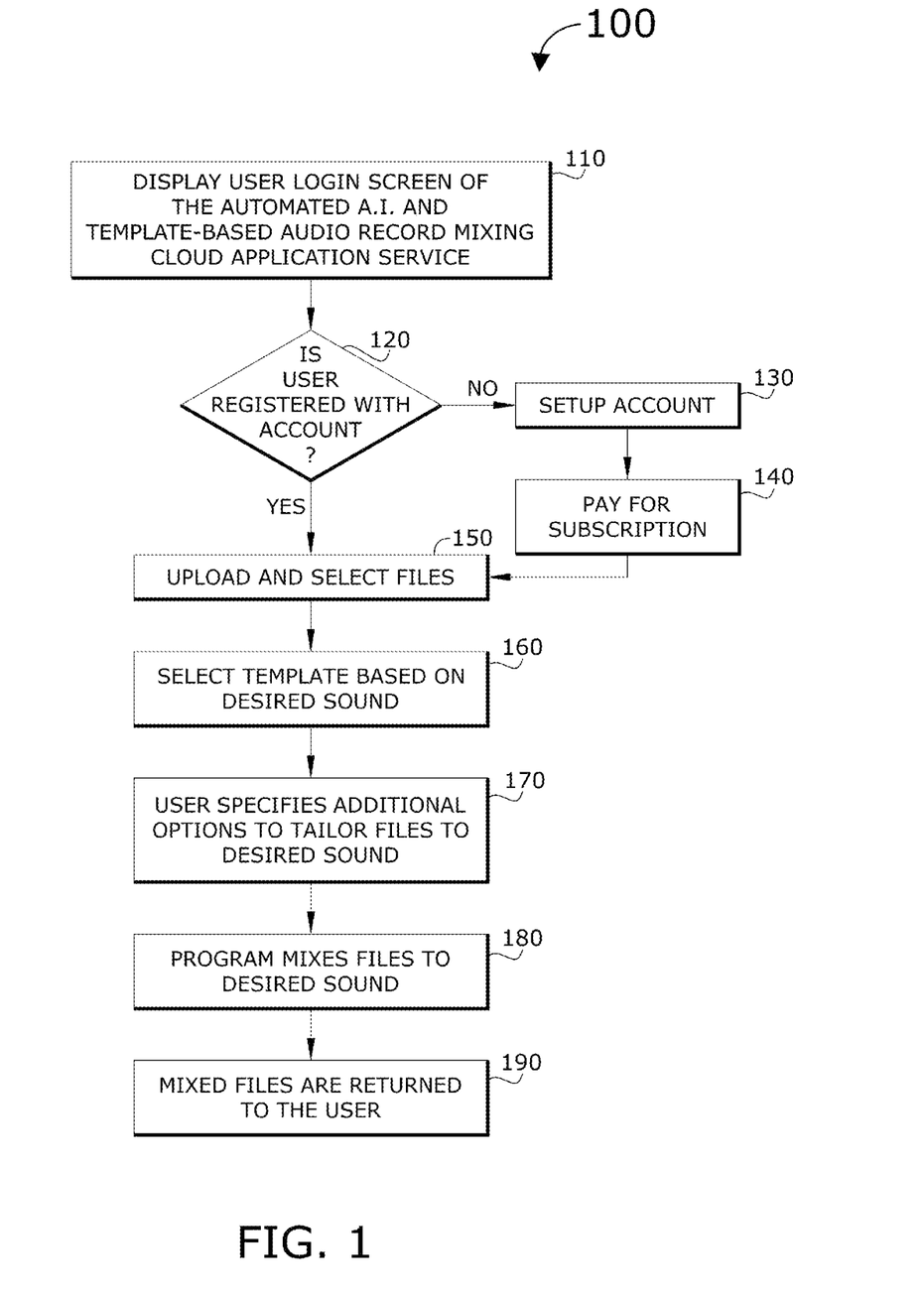
FIG. 1 conceptually illustrates an automated artificial intelligence (AI) and template-based audio record mixing process in some embodiments in which mixing is automatically performed instantaneously for artists while ensuring that the artists retain full control over how the record will sound.

By way of example, FIG. 1 conceptually illustrates an automated artificial intelligence (AI) and template-based audio record mixing process 100. The automated AI and template-based audio record mixing process 100 performs sound mixing automatically and instantaneously while ensuring that the artists retain full control over how the record mix will sound. As shown in this figure, the automated AI and template-based audio record mixing process 100 starts when a user computing device connects to an automated AI and template-based audio record mixing cloud application service. Upon connection, the automated AI and template-based audio record mixing process 100 displays a user login screen (at 110) in which the user may enter user credentials, such as username and password. In some embodiments, a two-factor authentication scheme is employed and the automated AI and template-based audio record mixing cloud application service sends a unique code in an email or text message to the user, which the user must input after entering the original user credentials. Next, the automated AI and template-based audio record mixing process 100 determines (at 120) whether the user is registered with a previously setup account. When the user is registered with an account, the automated AI and template-based audio record mixing process 100 continues forward to allow the user to interact with the automated AI and template-based audio record mixing cloud application service by, for example, uploading and selecting files (at 150) to use as audio tracks for creating an audio record mixed master. Uploading and selecting files (at 150) is described in further detail below. On the other hand, when the user is not registered with an account, the automated AI and template-based audio record mixing process 100 proceeds to a step for account setup (at 130) which includes user registration and where the user may configure various user settings. After the user account is setup, the automated AI and template-based audio record mixing process 100 continues to the next step for the user to pay for a subscription (at 140) to use the automated AI and template-based audio record mixing cloud application service to have audio record mixed masters automatically and instantaneously created as desired.

In some embodiments, the automated AI and template-based audio record mixing process 100 then proceeds to the step for uploading and selecting files (at 150) to use as audio tracks for creating an audio record mixed master. For example, the user may have an audio track they wish to have mastered according to a particular sound. In this case, the user would upload the file with the audio track. On the other hand, the user may have previously uploaded audio track files and stored them for later user, in which case the user may select one or more of the previously stored audio track files to use in creating an audio record mixed master.

After the user uploads or selects a file, the automated AI and template-based audio record mixing process 100 of some embodiments continues to the next step at which the user selects a template based on a desired sound (at 160). That is, the user selects a particular template from several different audio sound templates provided by the automated AI and template-based audio record mixing cloud application service. Next, the user may specify additional options (at 170) to tailor files to the desired sound. For example, the user may choose which instrument is to be given prominence in the mixing automatically performed by the automated AI and template-based audio record mixing cloud application service. Then the user may select a tool or option to start the automated mixing.

In some embodiments, the automated AI and template-based audio record mixing process 100 mixes the files (at 180) to achieve the desired sound, based on the options and selected template(s). The mixing in some embodiments is performed intelligently in connection with an AI and machine-learning module that is in communicably connection with a record mixing project manager process that automatically monitors mixing as performed by the automated AI and template-based audio record mixing cloud application service.

In some embodiments, the automated AI and template-based audio record mixing process 100 then outputs a resultant audio record mixed master (at 190) which is returned to the user as one or more audio record mixed master file(s).

Figure 2:
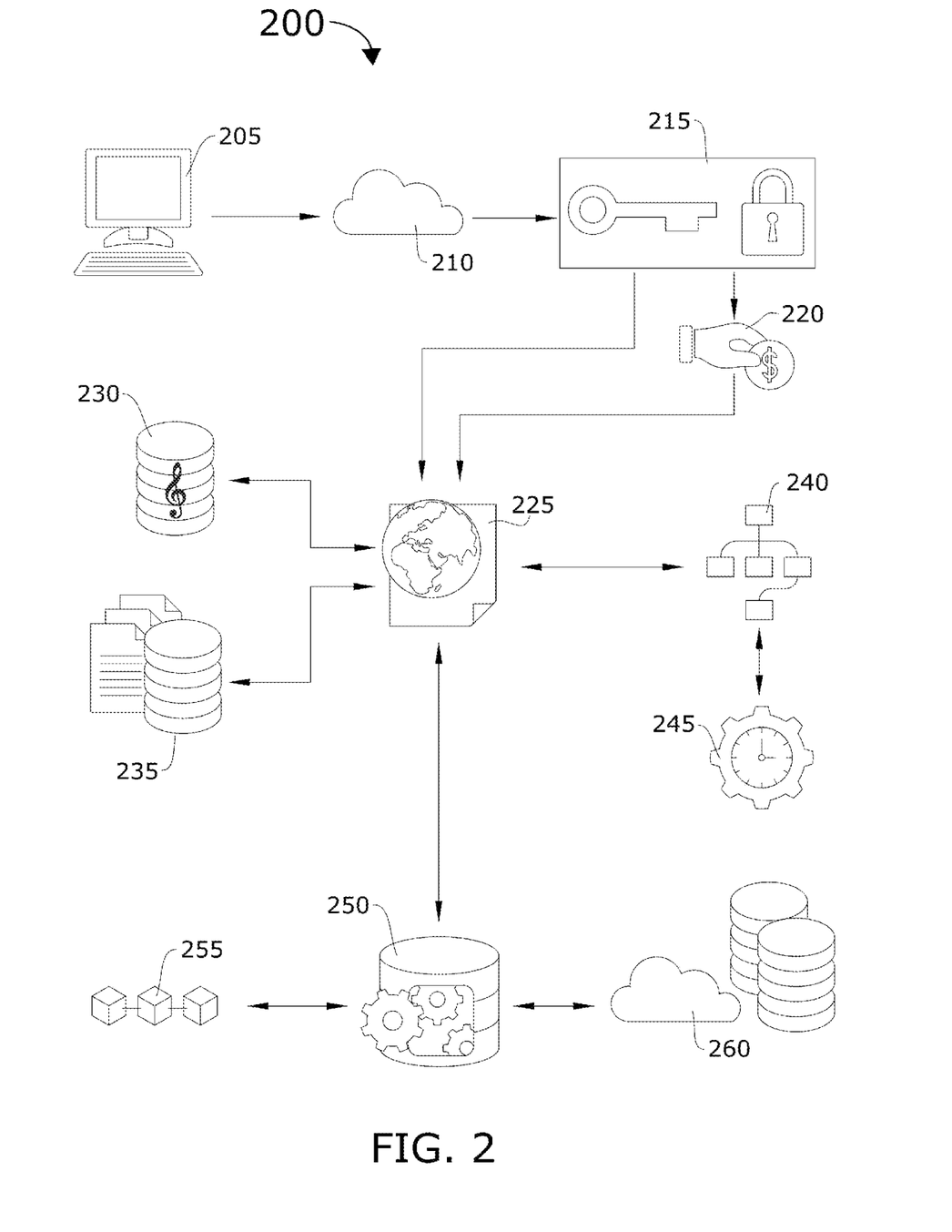
FIG. 2 conceptually illustrates an automated AI and template-based audio record mixing system in some embodiments.

By way of another example, FIG. 2 conceptually illustrates an automated AI and template-based audio record mixing system 200. As shown in this figure, the automated AI and template-based audio record mixing system 200 comprises a musician user interface 205, an automated AI and template-based audio record mixing cloud application service 210, a user authentication login system 215, an account setup, registration, and payment system 220, an automated AI and template-based audio record mixing platform 225, a music database 230, a templates database 235, a record mixing project manager 240, a time code synchronization unit 245, an AI and machine-learning module 250, an audio record mixing blockchain 255, and external cloud database storage 260.

In some embodiments, the musician user interface 205 is a user interface (UI) of a software application that is visually output onto a screen of a computing device (such as a desktop or laptop computer, a smartphone, a mobile device, a tablet computing device, etc.) to allow a user to interact with the automated AI and template-based audio record mixing cloud application service 210 when running the software application on the user's computing device. In this way, the user can interact with the musician user interface 205 to navigate around different areas of the automated AI and template-based audio record mixing platform 225 when connected to the automated AI and template-based audio record mixing cloud application service 210.

In some embodiments, the automated AI and template-based audio record mixing cloud application service 210 is hosted by a cloud server that is configured to provide network session management and data transmission management for software-as-a-service (SaaS) cloud compute environments to which user computing devices connect in fully encrypted, exclusive sessions with the automated AI and template-based audio record mixing cloud application service 210. As such, the user interacting with the musician user interface 205 would be able to seamlessly interact with the automated AI and template-based audio record mixing cloud application service 210 with complete confidence of data privacy and security. Thus, the user would engage with the automated AI and template-based audio record mixing cloud application service 210 to upload audio track files previously recorded by the user, select templates that relate to particular sounds or sound styles, and other options to create audio record mixed masters, and to receive, retrieve, download, or otherwise obtain their automatically created mixed master files as well as their uploaded files. User access to the automated AI and template-based audio record mixing cloud application service 210 is based on validation of authenticated registered user login, which is managed by the user authentication login system 215. Then after successful, authenticated user login (or account setup and registration which may include subscription payment), the user can access all tools and interfaces to use the cloud application service to create audio record mixed master files based on a desired sound.

In some embodiments, the user authentication login system 215 is configured to validate user logins of registered users. In some embodiments, validation of authenticated registered user login involves validation of user credentials. In some embodiments, validation of authenticated registered user login is based on a two-factor authentication scheme. Whatever validation method is employed, the user authentication login system 215 is triggered by a connection request from the user computing device, whereby this initial access for a session will automatically trigger the user authentication login system 215 to visually output a user login and authentication screen in the musician user interface 205. As noted above, the login may require user credentials only (e.g., username and password) while a more secure two-factor authentication scheme is employed in some embodiments, which triggers the user authentication login system 215 to visually output the user login and authentication screen in the musician user interface 205 first (requiring user credentials, e.g., username and password) and then, based on the two-factor authentication scheme requirements, generating a unique code that is either emailed to the user or sent in a text message to a device of the user. Thus, after the user enters valid user credentials in the musician user interface 205, the user authentication login system 215 would then display a code input field in the musician user interface 205 for the user to input the unique code received via email or text message. Only when both the user credentials and the passcode (or unique code) are determined by the user authentication login system 215 to be valid is the user allowed to enter the automated AI and template-based audio record mixing cloud application service 210. While the user authentication login system 215 may allow the user to retry when one or both of the login items are not valid, the user authentication login system 215 unlocks (or opens) the session when all user login checks are validated. Then the automated AI and template-based audio record mixing cloud application service 210 of some embodiments automatically navigates to the automated AI and template-based audio record mixing platform 225. Note that the email address of the user and/or phone number of the user are user configuration settings which the user is required to enter upon account setup and registration. Thus, the user authentication login system 215 also uses the email or phone to communicate with the user in the event of a lost/forgotten password or username or a password or username reset.

In some embodiments, the account setup, registration, and payment system 220 provides tools for the user to set up a new account, register as a user, add, change, or delete various user settings, and select and pay for a subscription. In some embodiments, there are a plurality of different subscription tiers associated with different payment levels. For example, a curious new user may select a one-time-use subscription tier and pay one-time fees for a single session connection to the automated AI and template-based audio record mixing cloud application service 210. Alternatively, a dedicated musician may select a year-long subscription tier and pay for the full year of access up front or select a payment plan (e.g., monthly payments for the year). Another subscription tier may provide a lifetime subscription for an upfront full payment. Similar to the user authentication login system 215, the account setup, registration, and payment system 220 may use the email address or the phone number as a way to communicate with the user in the event expired credit card, payment problems, delivery of payment receipts, send notifications for special promotions, etc.

In some embodiments, the automated AI and template-based audio record mixing platform 225 is a main page or site for users interacting with the automated AI and template-based audio record mixing cloud application service 210. The automated AI and template-based audio record mixing platform 225 may be a website, a web app, or another remote application. As the main page or site, this is where the user will interact with the automated AI and template-based audio record mixing cloud application service 210 to make unique mixes and masters for the project.

In some embodiments, the music database 230 stores all the music files and music of the user in encrypted, secure format so that only the user who uploaded the music files can access and select their music stored in the music database 230 to create mixes and masters. The users corresponding to their own music in the database can also elect to delete unnecessary files from the music database 230. The record mixing project manager 240, the time code synchronization unit 245, and the AI and machine-learning module 250 all access the music database 230 in order to instantaneously generate an audio record mixed master for the user. The user can choose to persistently store all files used in the creation of the audio record mixed master or optionally delete the source files after the audio record mixed master is created and downloaded, obtained, retrieved, or otherwise received by the user. Another option for the user is to store all files and data, including the resultant audio record mixed master file, to the audio record mixing blockchain 255, or another blockchain implementation of an immutable distributed ledger, which is fully encrypted and cannot be altered or modified. In this way, the user will have backups of files if the file has been lost or damaged.

In some embodiments, the templates database 235 stores all template files provided by the automated AI and template-based audio record mixing cloud application service 210. Authenticated, valid users are shown lists of different types of mixes when interacting with the automated AI and template-based audio record mixing platform 225. In this way, the user can select a type of mix they want from the list of different mixes which correspond to the templates stored in the templates database 235. When the user does make a particular selection of a type of mix from the list of different mixes, the automated AI and template-based audio record mixing platform 225 retrieves the corresponding template from the templates database 235 and associates the retrieved template with the user files and options to be used in creation of the mix/master. Notably, the templates cover all genres of music.

In some embodiments, the record mixing project manager 240 monitors the automated record mixing for quality control. In some embodiments, the record mixing project manager 240 also monitors the timeliness of creating and outputting the resultant audio record mixed master files for users. In some embodiments, the record mixing project manager 240 tracks output data including the number of files output in aggregate over particular time periods (e.g., daily, weekly, monthly, yearly, etc.). In some embodiments, the record mixing project manager 240 detects concurrent requests for automated creation of audio record mixed masters by different users and monitors concurrency status issues related to throughput, speed, completion of all concurrent requests, and delivery success rate for the delivery of resultant audio record mixed master files to user, among other multi-user scaling issues. In some embodiments, the record mixing project manager 240 also sends quality and accuracy data to the machine learning program of the AI and machine-learning module 250. Similar to the user authentication login system 215 and the account setup, registration, and payment system 220, the record mixing project manager 240 may use the email address or the phone number of any particular user to inquire about the quality of a resultant audio record mixed master file or to identify ways to improve the service, etc.

In some embodiments, the time code synchronization unit 245 automatically performs a time synchronization process before automated creation of an audio record mixed master. Specifically, the time code synchronization unit 245 automatically synchronizes timing between the different files and audio to be used in a mix/master. For example, if some of the files or audio clips start with sound immediately upon playback, but other files or audio clips start after ten seconds of a vocal voicing introduction that is not to be used, but is mere meta-information about the actual audio, then the time code synchronization unit 245 will snap the start time for audio to a common time across all audio input sources to ensure that the files and audio are synchronized. In some embodiments, the time code synchronization unit 245 interacts directly with the AI and machine-learning module 250 to determine a start time for any single file or audio source, as the AI program of some embodiments is configured to intelligently distinguish audio to be used for a mix/master from other noise in the file, audio clip, or other audio source. In some embodiments, the time code synchronization unit 245 generates time code synchronization data based on the time code synchronization process and transmits the time code synchronization data to the AI and machine-learning module 250 for mix/master processing.

In some embodiments, the AI and machine-learning module 250 comprises at least two interconnected programs, namely, an AI program and a machine-learning program. In some embodiments, the AI program identifies an appropriate sound mix in which to intelligently mix all inputs (user audio tracks, selected sound options, selected templates, time code synchronization data from the time code synchronization unit, etc.) to complete the resultant audio record mixed master. In some embodiments, the machine-learning program compares all aspects of audio after mixing/mastering to expected audio mix/master output. The comparison includes one or more of at least the following mix/master audio aspects: audio leveling accuracy, time code signature normalization output across all inputs, rhythm, voice audio, and instrumentation output levels with expected output), etc. In some embodiments, the machine-learning program also receives quality and accuracy data and user feedback data from the record mixing project manager 240. In some embodiments, the machine-learning program ingests the quality and accuracy data and the user feedback data received from the record mixing project manager 240, which are then transformed into data points that allow the machine-learning program to adjust one or more aspects for mixing/mastering as by the AI program. In this way, the AI and machine-learning module 250 is a self-learning system that constantly improves its functioning with respect to creating and outputting audio record mixed masters.

In some embodiments, the audio record mixing blockchain 255 is optionally deployed as an immutable, distributed option for storing the data for each user in encrypted data blocks. In some embodiments, recording transactions to blocks in the audio record mixing blockchain 255 automatically time stamps the data or files being stored. In some embodiments, recording transactions to blocks in the audio record mixing blockchain 255 automatically encrypt and encode the data or files as block transactions for audio record mixed master output. Being immutable and encrypted, the audio record mixing blockchain 255 is a storage mechanism that ensures that original user audio track files and mixed master output audio are incapable of unauthorized copying, listening, or theft, and incapable of tracing back and identifying the user. In this way, the audio record mixing blockchain 255 provides privacy of user identity (via highly secure encryption schemes, such as SHA-256, SHA-512, AES-256, AES-512, etc.), data security (data immutability via multiple distributed copies of the blockchain), and mobility (distributed and accessible from anywhere) that is typically unmatched in other storage mechanisms.

In some embodiments, the external cloud database storage 260 provides another storage option for the user. The user can configure this option in user settings. Then, the user can optionally save the resultant audio record mixed master file and any or all source audio files to the external cloud database as configured/set in the user settings.

To use the automated AI and template-based audio record mixing system and process of the present disclosure, a musician or artist (a "user") who has recorded audio/sounds and may have also recorded vocals (sung by the user or other singers) would access the automated AI and template-based audio record mixing cloud application service 210 via a user computing device. From there, the user would be able to create a unique mix for the record before getting it mastered. This is simple for the user who only needs to select a source audio file, a sound template, set options (prominent instruments, etc.), and then click a UI button to have the automated AI and template-based audio record mixing cloud application service 210 automatically and instantaneously create the audio record mixed master.

Many of the above-described features and applications are implemented as software processes that are specified as a set of instructions recorded on a computer readable storage medium (also referred to as computer readable medium, machine readable medium, or non-transitory computer readable medium). When these instructions are executed by one or more processing unit(s), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include application software and associated user interfaces, mobile app software, server software modules and processing units, cloud application service and web server software, database management software systems, firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
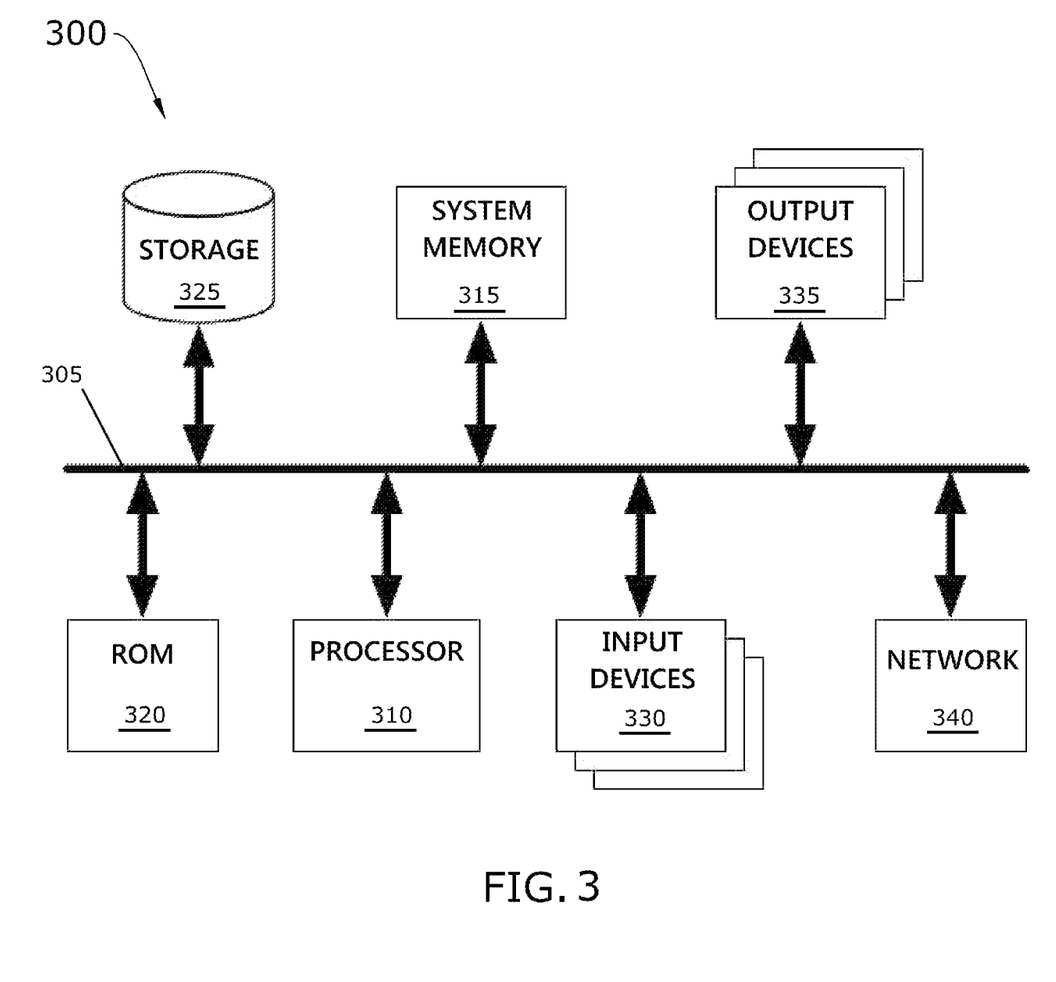
FIG. 3 conceptually illustrates an electronic system with which some embodiments of the invention are implemented.

FIG. 3 conceptually illustrates an electronic system 300 with which some embodiments of the invention are implemented. The electronic system 300 may be a computer, a laptop, a smartphone, a mobile device, a tablet computing device, another handheld computing device, a server, or any other sort of electronic device or computing device. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only memory 320. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include audio speakers and display devices, such as liquid crystal displays (LCD) or organic light emitting diode (OLED) displays. Some embodiments include devices such as a touchscreen that function as both an input and output device.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (also known as computer-readable storage media, machine-readable media, or machine-readable storage media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An automated AI and template-based audio record mixing process comprising:

uploading, by a particular user operating a computing device and interacting with a musician user interface of an automated AI and template-based audio record mixing cloud application service, files to a music database of an automated AI and template-based audio record mixing platform accessible to the particular user through the musician user interface when the computing device operated by the particular user is communicably connected to the automated AI and template-based audio record mixing cloud application service, wherein the files comprise audio files with audio tracks recorded by the particular user;

selecting, by the particular user interacting with the music database through the musician user interface and via the automated AI and template-based audio record mixing platform, a particular audio file from the uploaded files, said particular audio file comprising a particular audio track recorded by the particular user;

navigating, by the particular user interacting with the automated AI and template-based audio record mixing platform through the musician user interface, to a templates database area of the automated AI and template-based audio record mixing platform;

selecting, by the particular user interacting with the templates database area of the automated AI and template-based audio record mixing platform through the musician user interface, a particular template from a plurality of different audio sound templates stored in a templates database in the templates database area of the automated AI and template-based audio record mixing platform, wherein the particular template comprises a particular template mix that corresponds to a particular mixing sound among the plurality of different audio sound templates stored in the templates database of the automated AI and template-based audio record mixing platform of the automated AI and template-based audio record mixing cloud application service;

specifying, by the particular user interacting with the musician user interface, additional options to tailor the particular audio track of the particular file to a particular sound the user desires;

receiving a selection of a record mixing tool of the automated AI and template-based audio record mixing platform, wherein the selection of the record mixing tool is made by the particular user interacting with the musician user interface, wherein the recording mixing tool is configured to trigger automatic mixing of the particular file based on the template mix of the particular template and the specified additional options;

automatically synchronizing, by a time code synchronization unit of the automated AI and template-based audio record mixing platform, timing between a plurality of audio input sources comprising the particular audio track of the particular audio file, a time signature of the particular sound of the specified additional options, and the particular template mix of the particular template;

identifying, by an AI and machine-learning module, a particular sound mix that is consistent with the particular mixing sound to intelligently mix the plurality of time-synchronized audio input sources;

automatically creating, by the AI and machine-learning module, a resultant mixed master file with the particular sound mix of the plurality of time-synchronized audio input sources; and outputting, by the automated AI and template-based audio record mixing cloud application service, the resultant mixed master file for the user to retrieve from the automated AI and template-based audio record mixing cloud application service by download onto the user computing device.

2. The automated AI and template-based audio record mixing process of claim 1 further comprising:

displaying, upon the user accessing the automated AI and template-based audio record mixing cloud application service by the user computing device connecting over the Internet, a user login screen of the automated AI and template-based audio record mixing cloud application service;

receiving, at the automated AI and template-based audio record mixing cloud application service, user credentials associated with the user; and determining whether the user credentials correspond to an account in the automated AI and template-based audio record mixing cloud application service that is registered for the user.

3. The automated AI and template-based audio record mixing process of claim 2 further comprising setting up a new user account to register as a valid user of the automated AI and template-based audio record mixing cloud application service when the user credentials do not correspond to an account in the automated AI and template-based audio record mixing cloud application service that is registered for the user.

4. The automated AI and template-based audio record mixing process of claim 3 further comprising paying, after the user sets up the new user account and is registered as a valid user, for a subscription to use the automated AI and template-based audio record mixing cloud application service.

5. The automated AI and template-based audio record mixing process of claim 1, wherein the additional options comprise an option specifying which instruments the user intends to be prominent in the mix.

6. An automated artificial intelligence (AI) and template-based audio record mixing system comprising:

a cloud server that is configured to manage user sessions associated with user connections from user computing devices over the Internet;

an automated AI and template-based audio record mixing cloud application service that is hosted by the cloud server and configured to automatically and instantaneously create audio record mixed master files based on audio mix inputs and a desired sound of a particular user;

an automated AI and template-based audio record mixing platform that is configured as a main site for users of the automated AI and template-based audio record mixing cloud application service;

a music database that is communicably connected to the automated AI and template-based audio record mixing platform and stores all music files and music data for the particular user and all other users, wherein the music database stores particular music files and particular music data associated with the particular user in connection with an audio record mix and master project started by the particular user;

a templates database that is communicably connected to the automated AI and template-based audio record mixing platform and stores a plurality of sound templates from which the particular user selects a particular template associated with the desired sound of the particular user;

a record mixing project manager that is communicably connected to the automated AI and template-based audio record mixing platform and monitors automated mixing of the audio mix inputs in connection with the audio record mix and master project of the particular user;

a time code synchronization unit that is communicably connected to the record mixing project manager and synchronizes timing across the audio mix inputs;

an encrypted user audio storage configured to encrypt and store the audio mix inputs of the particular user and any mixed master audio created for the particular user; and an AI and machine-learning module that is communicably connected to the automated AI and template-based audio record mixing platform and is configured to automatically and intelligently provide a unique sound mix and create a resultant audio record mix master based on the time synchronized audio mix inputs, the particular template selected by the particular user, and the desired sound of the particular user, wherein the AI and machine-learning module is further configured to provide the resultant audio record mix master to the automated AI and template-based audio record mixing cloud application service to create, encrypt, and store a resultant audio record mix master file in the encrypted user audio storage, wherein the resultant audio record mix master file is only accessible to the particular user, wherein the resultant audio record mix master file is decrypted and retrieved from the encrypted user audio storage upon access by the particular user.

7. The automated AI and template-based audio record mixing system of claim 6, wherein the audio mix inputs comprise at least one user-provided audio track file recorded by the particular user, a sound template selection by the particular user, and one or more selections of mix options by the particular user.

8. The automated AI and template-based audio record mixing system of claim 6, wherein the particular user interacts with the automated AI and template-based audio record mixing cloud application service by way of a musician user interface of a software application running on a user computing device operated by the particular user.

9. The automated AI and template-based audio record mixing system of claim 8 further comprising:

a user authentication login system that is configured to receive user login credentials from the musician user interface after the particular user inputs the user login credentials in a login screen displayed within the musician user interface; and an account setup, registration, and payment system that is configured to setup new accounts of new users, register the new users as valid users of the automated AI and template-based audio record mixing cloud application service, and receive payment in connection with user-selected subscription tiers.

10. The automated AI and template-based audio record mixing system of claim 6, wherein the encrypted user audio storage comprises an audio record mixing blockchain that is configured to immutably store encrypted data corresponding to the resultant audio record mix master file and the audio mix inputs of the particular user, wherein the resultant audio record mix master file and the audio mix inputs of the particular user are anonymously encrypted and stored to the audio record mixing blockchain, wherein the anonymously encrypted resultant audio record mix master file and audio mix inputs are accessible only and anonymously by the particular user.

11. The automated AI and template-based audio record mixing process of claim 1, wherein the time code synchronization unit is configured to snap a start time for audio to a common time across the plurality of audio input sources to ensure that the audio output for the plurality of audio input sources is synchronized.

12. The automated AI and template-based audio record mixing process of claim 1, wherein the time code synchronization unit is configured to interact directly with the AI and machine-learning module to determine a start time for each audio input source in the plurality of audio input sources.

13. The automated AI and template-based audio record mixing process of claim 1, wherein the time code synchronization unit is configured to generate time code synchronization data for synchronizing the timing between the plurality of audio input sources and transmit the time code synchronization data to the AI and machine-learning module for mix/master processing.

14. The automated AI and template-based audio record mixing process of claim 13, wherein the plurality of audio input sources comprises the particular audio track, other audio tracks of the particular audio file, one or more sound options, the particular template with the particular template mix that corresponds to the particular mixing sound, one or more other templates in the plurality of different audio sound templates, and the time code synchronization data.

15. The automated AI and template-based audio record mixing process of claim 1, wherein the AI and machine-learning module is configured to intelligently distinguish audio that is consistent with the particular mixing sound from other audio noise that is inconsistent with the particular mixing sound.

16. The automated AI and template-based audio record mixing system of claim 6, wherein the encrypted user audio storage comprises an external cloud database storage associated with the particular user.

17. The automated AI and template-based audio record mixing system of claim 16, wherein the external cloud database storage is configured as a user settings option by the particular user through a musician user interface of the automated AI and template-based audio record mixing platform.

* * * * *